US009375930B2

(12) United States Patent
Matsumoto

(10) Patent No.: US 9,375,930 B2
(45) Date of Patent: Jun. 28, 2016

(54) CHIP MANUFACTURING METHOD AND LIQUID EJECTING HEAD MANUFACTURING METHOD

(71) Applicant: SEIKO EPSON CORPORATION, Tokyo (JP)

(72) Inventor: Yasuyuki Matsumoto, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 202 days.

(21) Appl. No.: 13/850,105

(22) Filed: Mar. 25, 2013

(65) Prior Publication Data

US 2013/0276277 A1 Oct. 24, 2013

(30) Foreign Application Priority Data

Apr. 23, 2012 (JP) ................................. 2012-098104

(51) Int. Cl.

| | |
|---|---|
| ***B21D 53/76*** | (2006.01) |
| ***B23P 17/00*** | (2006.01) |
| ***B41J 2/16*** | (2006.01) |
| ***B41J 2/045*** | (2006.01) |

(52) U.S. Cl.

CPC .............. *B41J 2/1635* (2013.01); *B41J 2/0451* (2013.01); *B41J 2/0455* (2013.01); *B41J 2/04541* (2013.01); *B41J 2/04581* (2013.01); *B41J 2/161* (2013.01); *B41J 2/1629* (2013.01); *B41J 2/1632* (2013.01); *B41J 2/1645* (2013.01); *B41J 2/1646* (2013.01); *Y10T 29/42* (2015.01)

(58) Field of Classification Search

CPC ... Y10T 29/42; Y10T 29/49401; H01L 41/39; H01L 41/22; H01L 41/042; H01L 21/776251; H01L 21/78; B41J 2/1623; B41J 2202/20; H02N 2/14

USPC ........... 29/25.35, 890.1; 347/20, 40; 310/311, 310/316.01, 317; 438/459, 460

See application file for complete search history.

(56) References Cited

U.S. PATENT DOCUMENTS

| | | | | |
|---|---|---|---|---|
| 6,168,263 | B1 * | 1/2001 | Nojima et al. | 347/54 |
| 7,829,446 | B2 * | 11/2010 | Takahashi et al. | 438/524 |
| 2004/0002199 | A1 * | 1/2004 | Fukuyo et al. | 438/460 |
| 2004/0207697 | A1 * | 10/2004 | Conta | 347/71 |
| 2005/0130390 | A1 * | 6/2005 | Andrews et al. | 438/458 |
| 2005/0199592 | A1 * | 9/2005 | Iri et al. | 219/121.6 |
| 2005/0272223 | A1 * | 12/2005 | Fujii et al. | 438/459 |

(Continued)

FOREIGN PATENT DOCUMENTS

| | | |
|---|---|---|
| JP | 2006-281605 | 10/2006 |
| JP | 2008-119905 | 5/2008 |

(Continued)

*Primary Examiner* — Paul D Kim

(74) *Attorney, Agent, or Firm* — Workman Nydegger

(57) ABSTRACT

A liquid ejection apparatus manufacturing method includes forming a metallic film in at least the section to be cut of a bonding surface between the flow path forming substrate (a second substrate) and the protection substrate (a first substrate); forming a first fragile section on the protection substrate by irradiating the section to be cut of the protection substrate bonded to the flow path forming substrate from the protection substrate side with a laser beam whose condensing point is focused thereon, and forming a second fragile section on the flow path forming substrate by melting the metallic film of the section to be cut; and dividing the protection substrate and the flow path forming substrate bonded to each other along the first fragile section and the second fragile section.

15 Claims, 11 Drawing Sheets

S9

(56) References Cited

U.S. PATENT DOCUMENTS

| | | | | |
|---|---|---|---|---|
| 2006/0189100 | A1* | 8/2006 | Ishizuka | 438/460 |
| 2006/0192299 | A1* | 8/2006 | Hashimoto | 257/782 |
| 2006/0220183 | A1* | 10/2006 | Asai et al. | 257/622 |
| 2007/0111477 | A1* | 5/2007 | Maruyama et al. | 438/460 |
| 2007/0275542 | A1* | 11/2007 | Takahashi | 438/460 |
| 2008/0113459 | A1* | 5/2008 | Takahashi et al. | 438/21 |
| 2011/0138857 | A1 | 6/2011 | Numata et al. | |

FOREIGN PATENT DOCUMENTS

| | | |
|---|---|---|
| JP | 2011-062830 | 3/2011 |
| JP | 2011-121817 | 6/2011 |

* cited by examiner

S7

S8

200

COMPATRATIVE EXAMPLE

CHIP MANUFACTURING METHOD AND LIQUID EJECTING HEAD MANUFACTURING METHOD

BACKGROUND

1. Technical Field

The present invention relates to a chip manufacturing method of separating a first substrate and a second substrate bonded to each other into chips, a liquid ejecting head manufacturing method, and a liquid ejecting apparatus manufacturing method.

2. Related Art

As a liquid ejecting head used in an ink jet printer and the like, for example, an ink jet recording head that is obtaining by laminating a nozzle plate having an nozzle opening, a flow path forming substrate provided with a vibrating plate or a piezoelectric element and a reservoir forming substrate has been known. JP-A-2008-119905 discloses a manufacturing method of dividing the flow path forming substrate and the reservoir forming substrate bonded to each other into a plurality of silicon devices with a laser beam. The manufacturing method discloses forming an elastic film made of silicon dioxide on a silicon substrate, forming an insulator film made of zirconium oxide on the elastic film, bonding the reservoir forming substrate on the insulator film in a section to be cut using an adhesive, forming a concave portion on the flow path forming substrate of the section to be cut by leaving the elastic film and the insulator film thereon, and then irradiating the reservoir forming substrate with the laser beam. In this case, a condensing point of the laser beam is focused within the reservoir forming substrate to leave a connection section on a surface layer, and therefore a fragile section having a predetermined width is formed within the reservoir forming substrate. Then, an external force is applied to the flow path forming substrate and the reservoir forming substrate, and therefore the flow path forming substrate and the reservoir forming substrate are divided into a plurality of the liquid ejecting heads along the fragile section.

The above-described flow path forming substrate is provided with a communication section configuring a portion of the reservoir. Therefore, the liquid ejecting head becomes long in the longitudinal direction of a pressure generation chamber. Therefore, it is disclosed that the size of the liquid ejecting head in the longitudinal direction of the pressure generation chamber is reduced in a way that the reservoir is formed out of the flow path forming substrate and a portion of a wall surface configuring the reservoir is configured by a side wall of the flow path forming substrate and a protection substrate (see JP-A-2011-62830).

The technique disclosed in JP-A-2008-119905 is that the elastic film made of the silicon dioxide and the insulator film made of the zirconium oxide are left in the section to be cut of the flow path forming substrate without a metallic film. The elastic film and the insulator film transmit the laser beam whose condensing point is focused on the reservoir forming substrate and thus do not become the fragile section. Therefore, when the external force is applied to the flow path forming substrate and the reservoir forming substrate, these substrates are not divided along the fragile section of the reservoir forming substrate. On the other hand, in order to remove the elastic film and the insulator film of the section to be cut, another step is required.

Even when the reservoir is formed out of the flow path forming substrate in order to reduce a size of the liquid ejecting head in the longitudinal direction of the pressure generation chamber, at least the elastic film made of the silicon dioxide is left in the section to be cut of the flow path forming substrate, which becomes an edge of the reservoir, without the metallic film. Similarly, since the elastic film through which the laser beam whose condensing point is focused on the reservoir forming substrate is transmitted does not become the fragile section, when the external force is applied to the flow path forming substrate and the protection substrate, these substrates are not divided along the fragile section of the reservoir forming substrate. In addition, the edge of the reservoir side cannot provide a lead electrode for connecting the reservoir to a drive circuit of a piezoelectric element.

The above-described problems are similarly present in various methods of separating a first substrate and a second substrate bonded to each other into chips.

SUMMARY

An advantage of some aspects of the invention is to simplify a chip manufacturing process.

According to an aspect of the invention, there is provided a chip manufacturing method of separating a first substrate and a second substrate bonded to each other into chips at a section to be cut, the method including: forming a metallic film in at least the section to be cut of a bonding surface between the first substrate and the second substrate; forming a first fragile section on the first substrate by irradiating the section to be cut of the first substrate bonded to the second substrate from the first substrate side with a laser beam whose condensing point is focused, and forming a second fragile section on the second substrate by melting the metallic film of the section to be cut; and dividing the first substrate and the second substrate bonded to each other along the first fragile section and the second fragile section.

When the section to be cut of the first substrate bonded to the second substrate is irradiated from the first substrate side with a laser beam whose condensing point is focused thereon, the first fragile section is formed on the first substrate. The section to be cut of the substrate of this stage becomes the fragile section, and the substrates are not divided from each other. In addition, even if the section to be cut of the second substrate is made of material transmitting the laser beam, the metallic film of the section to be cut is melted, and thus the second fragile section is formed on the second substrate. Therefore, even if another step such as cutting or removing the section to be cut of the second substrate is not performed, it is possible to easily divide the first substrate and the second substrate along the first fragile section and the second fragile section in the subsequent dividing. Therefore, in the aspect, it is possible to simplify the chip manufacturing step.

According to another aspect of the invention, there is provided a liquid ejecting head manufacturing method which includes separating a flow path forming substrate having a pressure generation chamber communicating with a nozzle opening and an piezoelectric element applying pressure to the pressure generation chamber, and a protection substrate located above the piezoelectric element and bonded to the flow path forming substrate at a section to be cut, the method including: forming a metallic film in at least the section to be cut of a bonding surface between the flow path forming substrate and the protection substrate; forming a first fragile section on the protection substrate by irradiating the section to be cut of the protection substrate bonded to the flow path forming substrate from the protection substrate side with a laser beam whose condensing point is focused thereon, and forming a second fragile section on the flow path forming substrate by melting the metallic film of the section to be cut;

and dividing the protection substrate and the flow path forming substrate to each other along the first fragile section and the second fragile section.

Furthermore, the invention has an aspect of a liquid ejecting apparatus manufacturing method including the above-described liquid ejecting head manufacturing method.

When the section to be cut of the protection substrate bonded to the flow path forming substrate is irradiated from the protection substrate side with a laser beam whose condensing point is focused thereon, the first fragile section is formed on the protection substrate. The section to be cut of the substrate of this stage becomes the fragile section, and the substrates are not divided from each other. In addition, even if the section to be cut of the flow path forming substrate is made of material transmitting the laser beam, the metallic film of the section to be cut is melted, and thus the second fragile section is formed on the flow path forming substrate. Therefore, even if another step such as cutting or removing the section to be cut of the flow path forming substrate is not performed, it is possible to easily divide the protection substrate and the flow path forming substrate along the first fragile section and the second fragile section in the subsequent dividing. Therefore, in the embodiment, it is possible to simplify the liquid ejecting head manufacturing step.

Herein, the metallic film may be formed on the second substrate such as the flow path forming substrate, and may be formed on the first substrate such as the protection substrate. The metallic film may be formed over the entire bonding surface of the substrate, and may be formed only a portion including the section to be cut of the bonding surface of the substrate.

There may be a bonding material of an adhesive between the first substrate and the second substrate.

According to the aspect, a vibrating plate configuring a portion of a wall surface of the pressure generation chamber may be formed on the bonding surface of the flow path forming substrate, the metallic film may be formed on the vibrating plate of the section to be cut of the flow path forming substrate, and a region of an opposite side to the vibrating plate in the section to be cut of the flow path forming substrate may be removed, and then the forming of the fragile sections may be performed. The section to be cut of the flow path forming substrate is thinned, and thus the second fragile section is formed. Therefore, it is possible to more reliably separate the substrates. In particular, when the silicon oxide layer is formed on the bonding surface of the flow path forming substrate, and the metallic film is formed on the silicon oxide layer, it is possible to divide the substrates favorably.

According to the aspect, the pressure generation chamber may be formed on a surface of the opposite side to the vibrating plate of the flow path forming substrate and the region of the opposite side to the vibrating plate in the section to be cut of the flow path forming substrate may be removed, and a protection film having liquid resistance may be formed in inner surfaces of the pressure generation chamber and the removed region, and then the forming of the fragile sections may be performed. In this case, it is possible to provide a preferred manufacturing method that suppresses an erosion of the flow path forming substrate due to the liquid.

When as material of the metallic film, at least a portion of material of a lead electrode led out from the piezoelectric element on the vibrating plate may be used, it is possible to form the metallic film of the section to be cut when forming the lead electrode, and to reduce the manufacturing cost of the liquid ejecting head. In particular, when as material of the metallic film, at least the same material as material of a close contact layer of the lead electrode may be used, it is possible to form the metallic film in a preferred a thinness.

According to the aspect, the reservoir that accommodates liquid supplied to the pressure generation chamber is outwardly attached to chips formed in the dividing. In this case, it is possible to provide a liquid ejecting head manufacturing method suitable for miniaturizing the pressure generation chamber in the longitudinal direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described. The embodiments described below merely exemplify the invention.

Figure 1A:
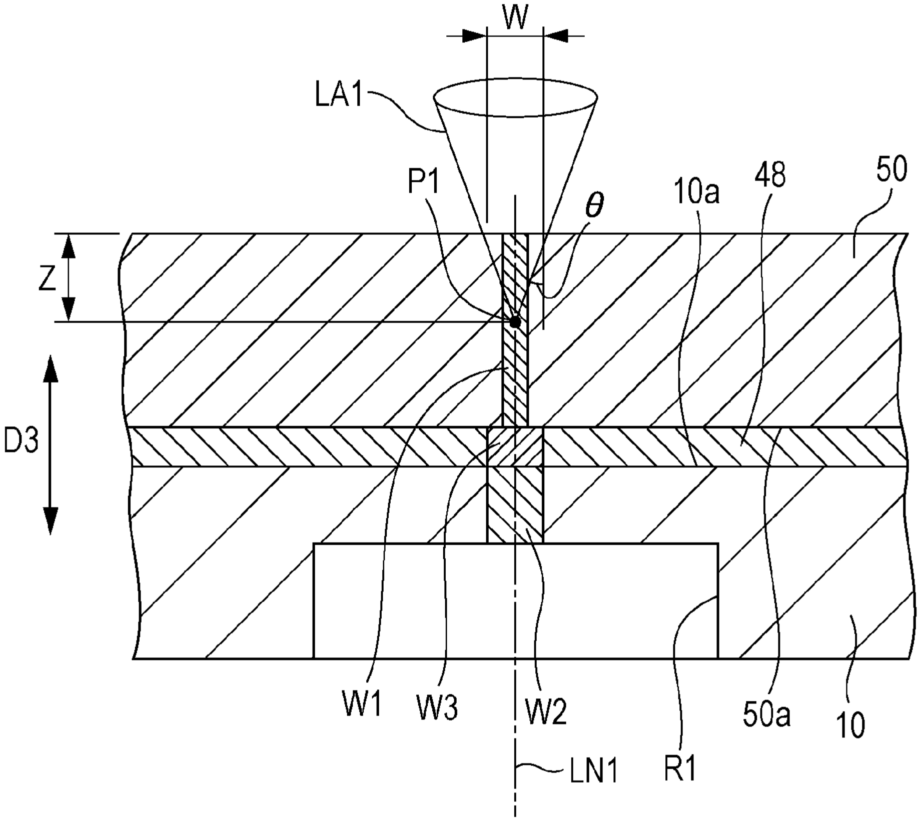
FIGS. 1A and 1B are views schematically illustrating an outline of a liquid ejecting head manufacturing method.
Figure 1B:
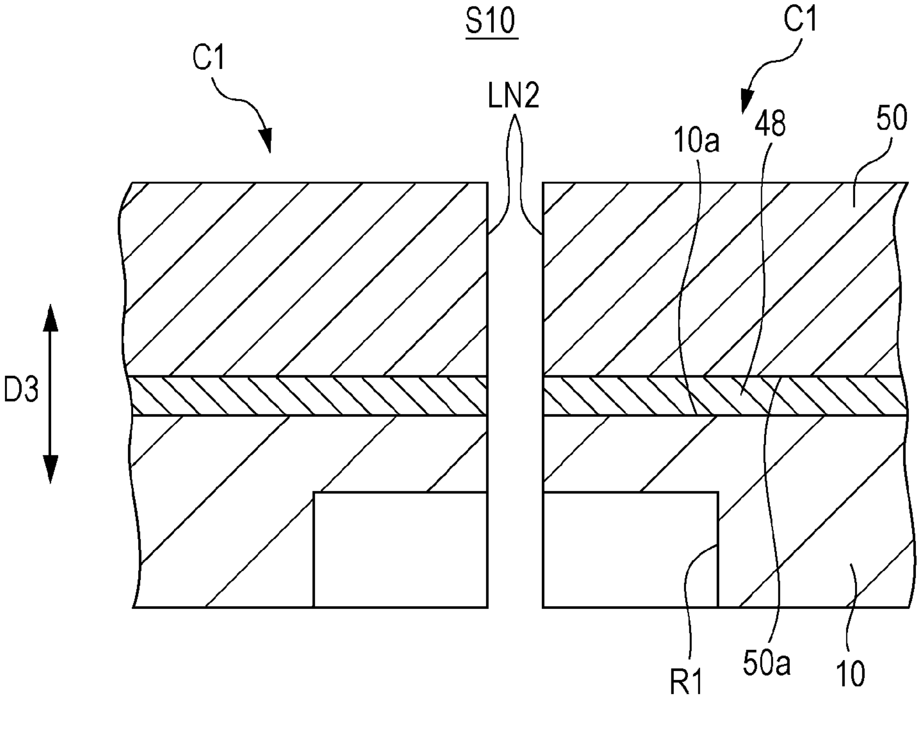
Figure 2:
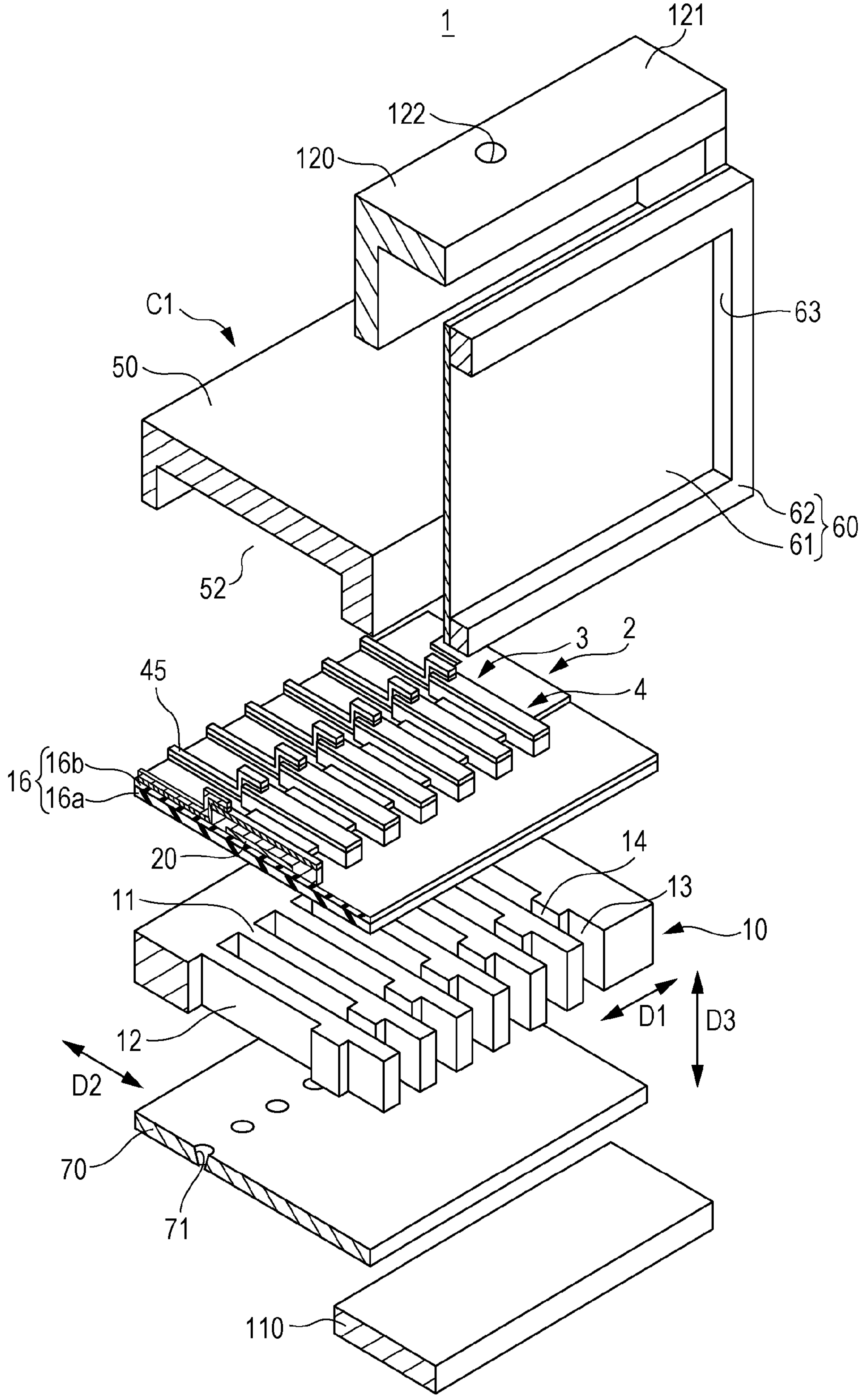
FIG. 2 is an exploded perspective view illustrating an outline of a main portion of a recording head (a liquid ejecting head) for convenience.
Figure 3A:
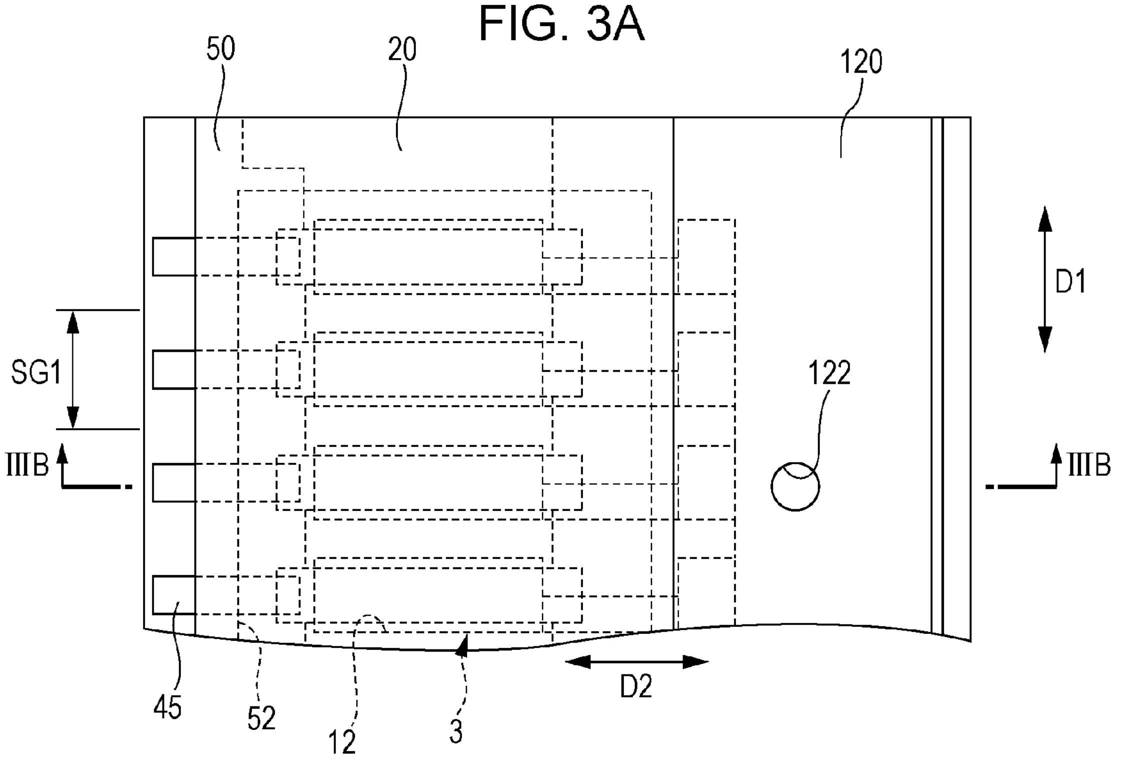
FIG. 3A is a plan view illustrating an outline of a main portion of a recording head and FIG. 3B is a cross-sectional view which is obtained by breaking one segment of a recording head at a position of IIIB-IIIB of FIG. 3A.
Figure 3B:
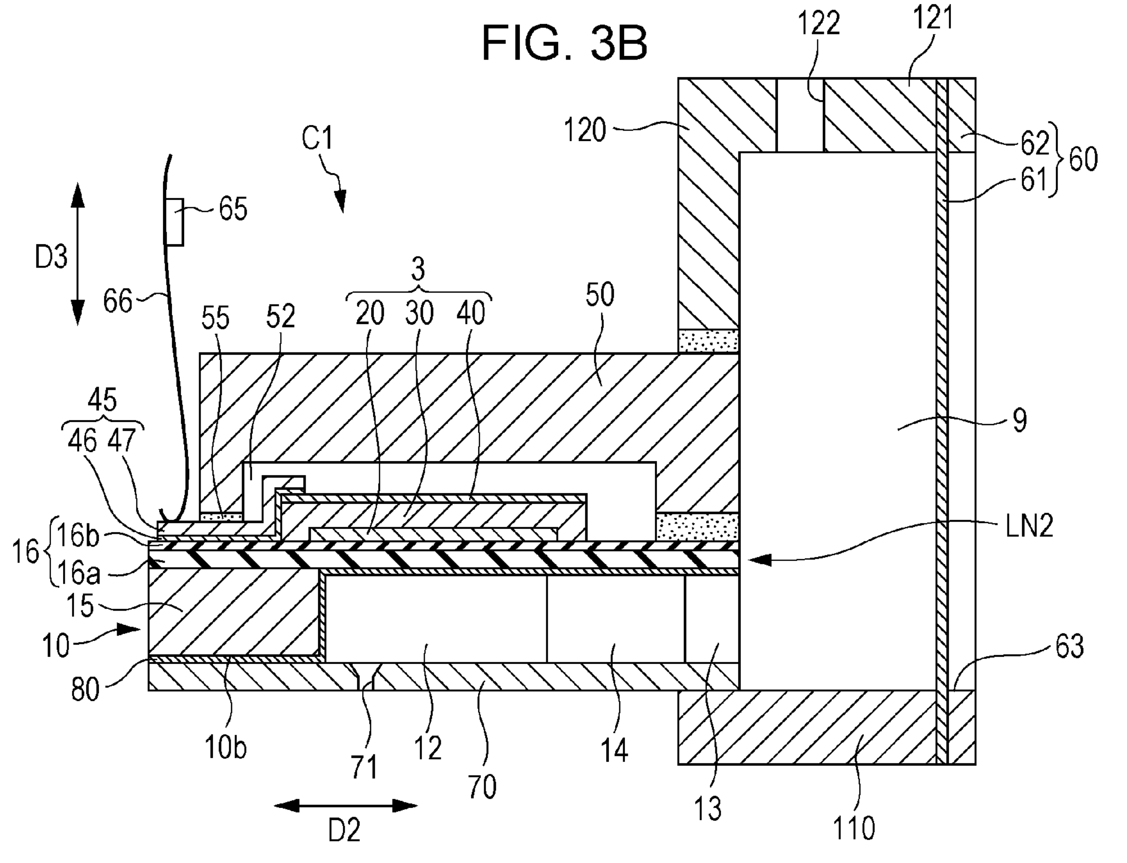

1. Example of Liquid Ejecting Head Obtained from Manufacturing Method of the Invention FIG. 1A is a vertical cross-sectional view schematically illustrating a state in which fragile sections (W1, W2) are formed with an irradiation of a laser beam LA1. FIG. 1B is a vertical cross-sectional view illustrating a state in which substrates (10, 50) are divided along the fragile sections (W1, W2). FIG. 2 is an exploded perspective view explodedly illustrating a main portion of a recording head 1 that is an example of a liquid ejecting head obtained from a manufacturing method of the invention for convenience. FIG. 3A is a plan view illustrating an outline of a configuration of the recording head 1. FIG. 3B is a vertical cross-sectional view in which one segment of the recording head 1 is broken at a position of IIIB-IIIB of FIG. 3A. A microstructure having a possibility to remain in a vicinity of a cutting section LN2 after a division of the substrates is omitted in the drawings. D1 denotes the width direction of a pressure generation chamber 12. D2 denotes the longitudinal direction of the pressure generation chamber 12 orthogonal to the width direction D1. D3 denotes the thickness direction of a flow path forming substrate (a second substrate) 10, a vibrating plate 16, a protection substrate (a first substrate) 50 and the like, that is, the depth direction of the pressure generation chamber 12. To easily understand, an enlargement ratio of the width direction D1 and the thickness direction D3 is greater than that of the longitudinal direction D2, and each of drawings may not be matched.

A positional relationship described herein is merely an illustration for describing the invention, and does not limit the invention. Even if a second electrode is disposed in positions other than a first electrode, for example, a lower position, a right position, a left position and the like, which is included in an aspect of the invention.

In a chip C1 of the recording head 1 illustrated in FIG. 2, a nozzle plate 70 formed with a nozzle opening 71, the flow path forming substrate (the second substrate) 10 formed with a vibrating plate 16, an piezoelectric element 3 and a lead electrode 45, and the protection substrate (the first substrate) 50 of the flow path forming substrate 10 are laminated in this order. A liquid flow path such as the pressure generation chamber 12 communicating with the nozzle opening 71, a communication section 13 and an ink supply port 14 is formed within the flow path forming substrate 10. As illustrated in FIG. 3B, a protection film 80 is formed on the inner surface of the liquid flow paths (12 to 14) in order to suppress erosion due to the liquid flowing through the liquid flow path. In the recording head 1, a reservoir 9 accommodating the liquid to be supplied to the pressure generation chamber 12 is outwardly attached to the chip C1. The reservoir 9 is connected to the section to be cut LN2 of the divided chips C1. Therefore, the liquid within the reservoir 9 flows into the chip C1 from the outside of the pressure generation chamber in the longitudinal direction D2.

Figure 10:
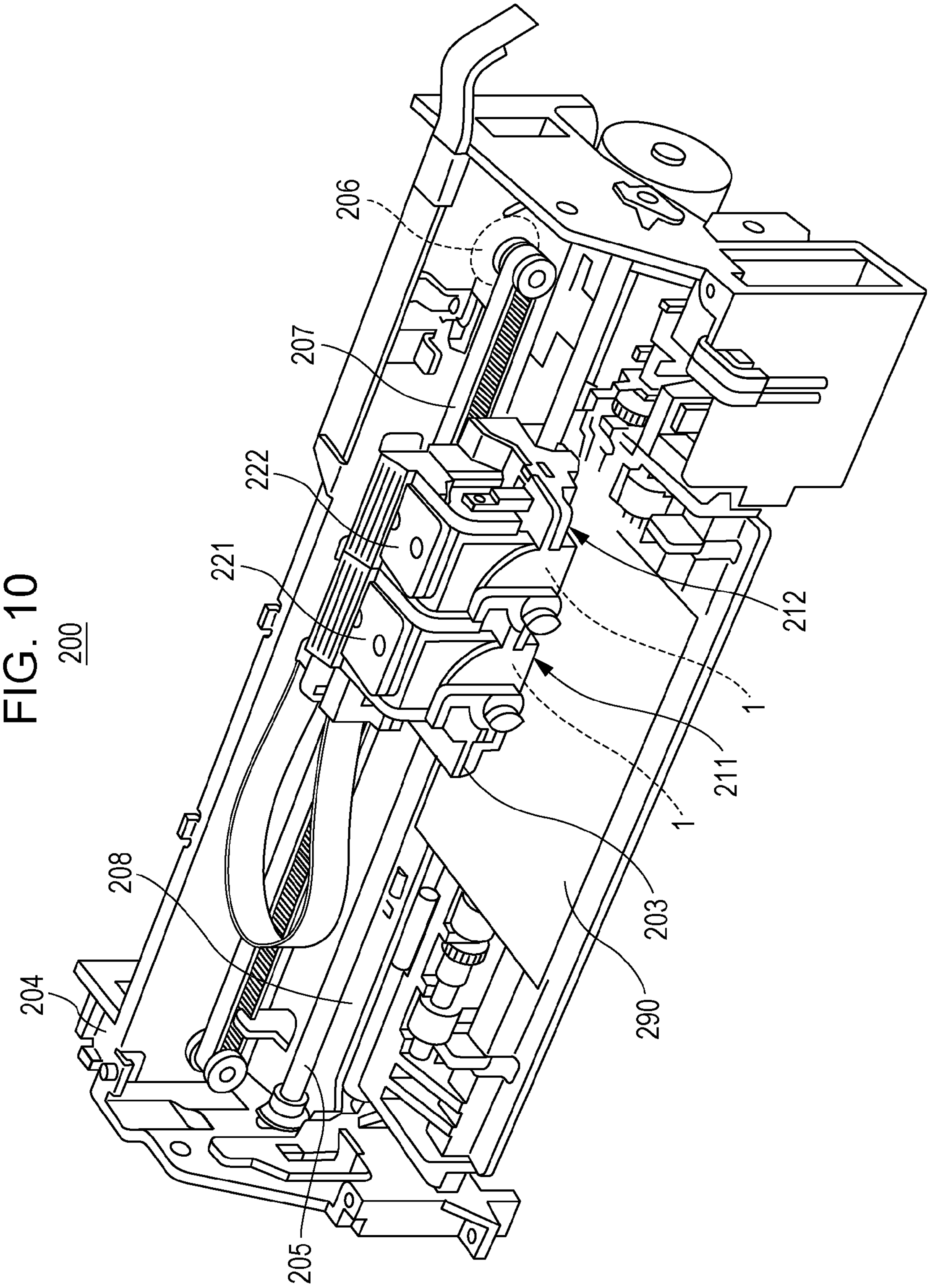
FIG. 10 is a view schematically illustrating a configuration of a recording apparatus (a liquid ejecting apparatus).

A liquid ejecting apparatus illustrated as a recording apparatus 200 illustrated in FIG. 10 includes the liquid ejecting head as above described.

The flow path forming substrate 10 may be made of a silicon single crystal substrate having a relatively thick thickness such as approximately 500 to 800 μm, and having a high rigidity. In the flow path forming substrate 10, segments SG1 are partitioned from each other by partitions 11, and long liquid flow paths (12 to 14) are formed for each segment SG1. The ink supply port 14 has a width narrower than that of the pressure generation chamber 12 and the communication section 13. The respective liquid flow paths (12 to 14) are arranged in the width direction D1 that is an arrangement direction of the pressure generation chamber 12.

The vibrating plate 16 has an elastic film 16*a* formed on a silicon substrate 15, and an insulator film 16*b* formed on the elastic film 16*a*, and configures a portion of a wall surface of the pressure generation chamber 12. The elastic film 16*a* may be made of silicon oxide ($SiO_x$), for example, and the insulator film 16*b*, may be made of zirconium oxide ($ZrO_x$), for example. The thickness of the vibrating plate 16 is not particularly limited as long as it has elasticity, but may be approximately 0.5 to 2 μm, for example.

The piezoelectric element 3 has a piezoelectric body layer 30, a lower electrode (a first electrode) 20 disposed on the pressure generation chamber 12 side of the piezoelectric body layer 30, and an upper electrode (a second electrode) 40 disposed on the other side of the piezoelectric body layer 30, and applies a pressure to the pressure generation chamber 12. A substantial active section 4 of the piezoelectric element 3 becomes an area in which the piezoelectric body layer 30 is interposed between the lower electrode 20 and the upper electrode 40. When the piezoelectric element is a common lower electrode structure, a position of an active end of an active section 4 becomes a boundary position of the upper electrode 40. When the piezoelectric element is a common upper electrode structure, a position of the active end of the active section 4 becomes a boundary position of the lower electrode 20. The piezoelectric element 3 is provided with the lead electrode 45 led out in order to connect to a drive IC (a semiconductor integrated circuit) 65.

The lead electrode 45 has a close contact layer 46 formed on the vibrating plate 16, and a main metallic layer 47 formed on the close contact layer 46. As constituent metal of the main metallic layer 47, gold (Au), platinum (Pt), aluminum (Al), copper (Cu), mixtures thereof and the like may be used. The thickness of the main metallic layer 47 may be approximately, 0.5 to 1.5 μm, for example. For the close contact layer 46, nickel-chromium ($Ni_xCr_{1-x}$; $0<x<1$), nickel (Ni), chromium (Cr), titanium (Ti) and the like may be used. The thickness of the close contact layer 46 may be approximately 30 to 70 nm, for example. Of course, when a close contact force between the vibrating plate 16 and the metallic layer 47 is sufficient, it is possible to omit the close contact layer 46. In addition, a layer other than layers 46 and 47 thereof may be provided on the lead electrode 45. The drive IC 65 is electrically connected to the lead electrode 45 via a drive wiring 66 to drive the arranged piezoelectric element 3. Of course, the drive circuit of the piezoelectric element 3 is not limited to the IC. For the drive wiring 66, a conductive wire such as a bonding wire may be used.

The piezoelectric body layer 30 is essentially formed on the upper surface of the lower electrode 20 in an area corresponding to at least the pressure generation chamber 12. For example, for the piezoelectric body layer 30, material having a perovskite structure such as ferroelectrics such as PZT (lead zirconate titanate, Pb ($Zr_x$, $Ti_{1-x}$) $O_3$), material obtained by adding metal oxide such as niobium oxide, nickel oxide and magnesium oxide to the ferroelectrics, non-lead-based perovskite oxide such as (Bi, Ba) (Fe, Ti) $O_3$ and material obtained by adding metal such as manganese to a B site of the non-lead based perovskite oxide may be used.

The thickness of the piezoelectric body layer 30 is not particularly limited, but may be approximately 0.2 to 5 μm for example.

As constituent metal of the electrodes (20, 40), one or more kinds of Pt (platinum), Au, Ir (iridium), Ti (titanium) and the like may be used. The constituent metal may be in a state of compound such oxide, may be in a state which that is not compound, may be in a state of alloy, may be in a state of single metal and may contain another metal in a small molar ratio while setting the metal as a main component. The thickness of the electrodes (20, 40) is not particularly limited, but may be approximately 10 to 500 nm, for example.

For the protection film 80 provided in the inner surface of the liquid flow paths (12 to 14), material having a liquid resistance may be used. The protection film 80 suppresses the erosion of the flow path forming substrate 10 due to the liquid. The thickness of the protection film 80 is not particularly limited, but may be approximately 30 to 70 nm, for example. It is preferable that material having an ink resistance (a kind of liquid resistance) be material having alkali-resistant material. Although it is preferable that such material be tantalum oxide ($TaO_x$) such as tantalum pentoxide (a stoichiometric ratio $Ta_2O_5$), material oxide such as zirconium oxide (a stoichiometric ratio $ZrO_2$) may be used according to a PH value of the ink, and material containing other materials (for example, metal oxide) in the tantalum oxide may be used. The protection film may be a single layer, and may be a laminated film such as a film obtained by laminating a tantalum oxide layer and other material layers.

The protection substrate 50 is bonded to the flow path forming substrate 10 by an adhesive 55, for example. The protection substrate 50 is referred to as a sealing plate located above the piezoelectric element 3 to protect the flow path forming substrate 10, particularly, the piezoelectric element on the vibrating plate 16. A piezoelectric element holding section 52 formed in an area opposing the piezoelectric element 3 has a space not to hinder operation of the piezoelectric element 3. For example, for the protection plate 50, a silicon single crystal substrate, glass, ceramic material, metal, resin and the like may be used. When the silicon substrate is used, the silicon oxide ($SiO_x$) layer may be formed on the surface thereof. The thickness of the protection substrate 50 is not particularly limited, but may be approximately 100 to 800 μm, for example. When a surface of opposite side to the bonding surface 50*a* of the protection substrate 50 is mirror-finished in advance by polishing such as a dry polishing processing, laser beam LA1 irradiated on the protection plate 50 can suppress a diffused reflection on the surface of the protection substrate 50. Therefore, by mirror-finishing, it is possible to perform a processing with the laser beam LA1 with high accuracy.

A nozzle plate 70 has a nozzle opening 71 bored therein, which communicates with the vicinity of an end of an opposite side to the ink supply port 14 of each pressure generation chamber 12 and is fixed to a surface of the protection film 80 side of the flow path forming substrate 10 with fixing means such as an adhesive, a heat welding film. Therefore, the pressure generation chamber 12 communicates with the nozzle opening 71 discharging the liquid. For the nozzle plate 70, glass-ceramic, a silicon single-crystal substrate, stainless steel and the like may be used, and is fixed to a side of an opening surface of the flow path forming substrate 10. A thickness of the nozzle plate 70 is not limited, but may be, approximately 0.01 to 1 nm, for example.

The reservoir 9 illustrated in FIGS. 2 and 3B includes a reservoir bottom member 110, a reservoir ceiling member 120, and a compliance substrate 60. For the reservoir bottom member 110, a silicon single crystal substrate, iron alloy containing 42% of nickel (42 alloy), may be used and configures a bottom of the reservoir 9. The reservoir ceiling member 120 has a ceiling wall 121 and three side walls and is provided on the protection substrate 50 via the adhesive, for example. The ceiling wall 121 is provided with a liquid introducing hole 122 for introducing the liquid. The compliance substrate 60 is bonded to an opened side surface of the reservoir ceiling member 120 across the reservoir bottom member 110. For a sealing film 61 provided on the compliance substrate 60, flexible material having a low rigidity such as a polyphenylene sulfide (PPS) film) having a thickness of approximately 4 to 8 μm may be used, and seals one surface of the reservoir 9. For the fixing plate 62 provided on the compliance substrate 60, a hard material of metal such as a stainless steel (SUS) having a thickness of approximately 20 to 40 μm may be used, and an area facing the reservoir 9 becomes an opening 63.

Of course, a structure outwardly attaching the reservoir 9 to the substrate is not limited to the above-described structure.

Figure 11:
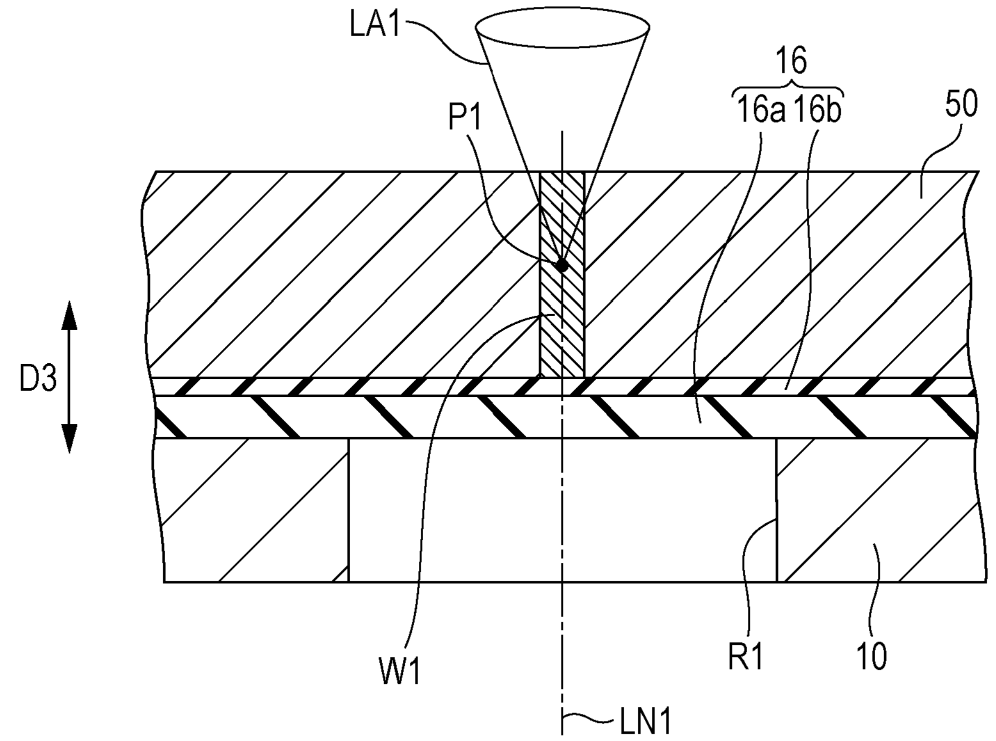
FIG. 11 is a cross-sectional view schematically illustrating a main portion of a recording head when a laser beam is irradiated in a comparative example.

Incidentally, as in a comparative example illustrated in FIG. 11, when the protection substrate 50 is bonded on the vibrating plate 16 of the section to be cut LN1 without the metallic film using the adhesive 55, the laser beam LA1 whose condensing point P1 is focused on the protection substrate 50 transmits the vibrating plate 16. In general, the silicon oxide configuring the elastic film 16*a*, and the zirconium oxide configuring the insulator film 16*b* are a transparent material, and has a property that the laser beam is transmitted therethrough. The silicon oxide and the zirconium oxide remaining at the section to be cut LN1 becomes the fragile section with the laser beam LA1 whose condensing point P1 is focused on the protection substrate 50. Therefore, when an external force such as an expanding break is applied to the flow path forming substrate 10 and the protection substrate 50, the substrates (10, 50) are not divided along the fragile section of the protection substrate 50. On the other hand, another process such as breaking is required for cutting or removing the vibrating plate 16 of the section to be cut LN1. Even if the insulator film 16*b* of the section to be cut LN1 is removed in advance, when the protection substrate 50 is bonded on the silicon oxide of the section to be cut LN1 without the metallic film, the silicon oxide does not become the fragile section with the laser beam LA1 whose condensing point P1 is focused on the protection substrate 50. Therefore, the substrates (10, 50) which are subjected to the external force are not divided along the fragile section of the protection plate 50. In addition, it is not possible to remove the entire vibrating plate 16 from the beginning. This is because the flow path forming substrate 10 is divided from the beginning, and the divided flow path forming substrates are not retained.

As illustrated in FIG. 1A, according to the manufacturing method, the metallic film 48 is formed on at least the section to be cut LN1 of the bonding surface (at least one of 10*a* and 50*a*) of the substrates (10, 50). When the reservoir 9 is outwardly attached to the substrate, an edge of the reservoir 9 side of the flow path forming substrate 10 cannot be provided with the lead electrode for connecting to the drive IC 65 of the piezoelectric element 3. Therefore, the metallic film 48 is different from the lead electrode. In addition, the section to be cut LN1 of the protection plate 50 bonded to the flow path forming substrate 10 is irradiated from the protection substrate 50 side with the laser beam LA1 whose condensing point P1 is focused thereon. Therefore, the first fragile section W1 is formed on the protection substrate 50, and the metallic film 48 of the section to be cut LN1 is melted. The protection substrate 50 of this stage is connected at the fragile section W1, and is not divided. Even if the section to be cut LN1 of the flow path forming substrate 10 is made of material which transmits the laser beam LA1, the metallic film 48 of the section to be cut LN1 is melted. Therefore, the second fragile section W2 is formed on the flow path forming substrate 10. Therefore, it is possible to easily divide the substrates (50, 10) along the fragile section (W1, W2) in a subsequent division step.

For example, the condensing point P1 is modified such a manner that the laser beam having a wavelength showing the transmission property with respect to the protection substrate 50 (for example, a silicon single crystal substrate) is condensed in order to focus on the section to be cut LN1 within the protection substrate 50 using a lens optical system, thereby forming the first fragile section W1. The wavelength showing the transmission property is a wavelength side longer than the wavelength showing an absorption property for melt cutting. Therefore, the protection substrate 50 is only fragile at the section to be cut LN1 on irradiation of the laser beam LA1, but is not cut. The first fragile section W1 means a modified area in which strength of a melted processed area crystallized after melting is fragile. The first fragile section W1 may be formed to leave a surface layer of the protection substrate 50 (at least one of the opposite surface to the bonding surface side). In addition, if the fragile section W1 is formed, when a portion of the first fragile section W1 is flaked off, a particular problem does not occur.

Figure 9:
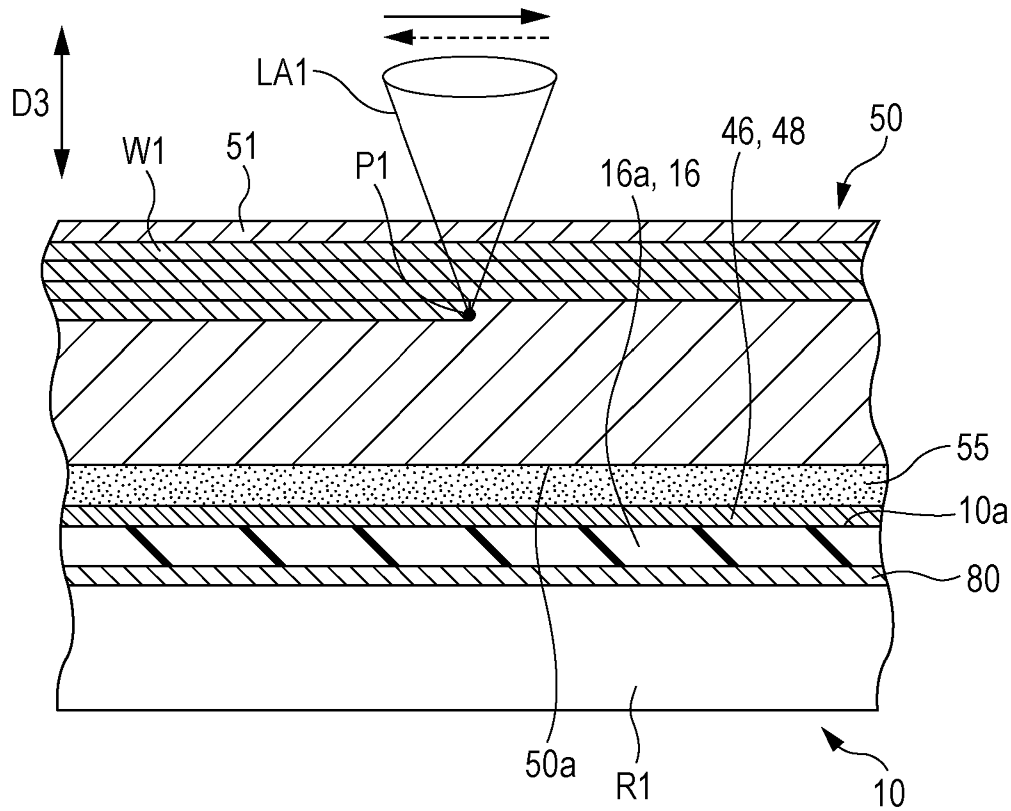
FIG. 9 is a cross-sectional view schematically illustrating a state in which a first fragile section is formed on a protection section.

The modification of the protection substrate 50 with the laser beam LA1 is performed to concentrate on the condensing point P1 and the vicinity thereof. As illustrated in FIG. 9, the depth of the condensing point P1 is changed at the section to be cut LN1, and then the first fragile section W1 may be formed by scanning the laser beam LA1 a plurality of times at a predetermined speed. FIG. 9 illustrates an example leaving a connection section 51 in the surface layer of the protection substrate 50.

Herein, as illustrated in FIG. 1A, when an incident width to the protection substrate 50 of the laser beam LA1 is W, and an incident angle of the laser beam LA1 within the protection substrate 50 is θ, the depth Z of the condensing point P1 is expressed by the following equation.

$$Z=W/(2\times\tan\theta) \quad (1)$$

Therefore, by the adjustment of the incident width W in the laser beam, it is possible to adjust the depth of the condensing point P1, that is, the processing depth.

When the section to be cut LN1 of the protection substrate 50 is irradiated from the protection substrate 50 side with the laser beam LA1 whose condensing point P1 is focused thereon, the metallic film 48 showing a non-transmission property with respect to the laser beam LA1 is melted. Material of the metallic film 48 may be material showing a heat absorption property with respect to the laser beam LA1, and as a constituent metal of the main metallic layer 48, nickel-chromium, nickel (Ni), chromium (Cr), titanium (Ti), gold (Au), platinum (Pt), aluminum (Al), copper (Cu), another non-transparent material, mixtures thereof and the like may be used. It is preferable that the metallic film 48 has a relatively thin thickness of approximately 30 to 70 nm, for example. In addition, when the metallic film 48 is not melted to the entire section to be cut LN1 by irradiating the section to be cut LN1 of the protection substrate with the laser beam whose condensing point is focused thereon, the metallic film 48 may be thin so that the entire section to be cut LN1 may be melted. In addition, when the flow path forming substrate 10 is not formed with the fragile section W2 to the entire section to be cut LN1 by melting the metallic film 48, the metallic film 48 may be thick so that the fragile section may be formed in the entire section to be cut LN1.

When as material of the metallic film 48, the same material as that of the close contact layer 46 of the lead electrode such as nickel-chromium is used, it is possible to form the metallic film 48 in a suitable thinness, which is melted to form the second fragile section W2. In addition, when the close contact layer 46 is formed, it is possible to form the metallic film 48 of the section to be cut LN1, and to reduce the manufacturing cost of the liquid ejecting head. Of course, a layer other than a material layer of the close contact layer 46 may be provided on the metallic film 48.

In addition, if as the material of the metallic film 48, the same material as material of the main metallic layer 47 of the lead electrode such as gold is used, it is possible to form the metallic film 48 of the section to be cut LN1 when the main metallic film 47 is formed, and to reduce the manufacturing cost of the liquid ejecting head. Of course, a layer other than a material layer of the metallic layer 47 such as the close contact layer 46 may be provided on the metallic film 48.

In addition, the metallic film 48 may be formed separately from the formation of the close contact layer 46.

The second fragile section W2 is formed on the flow path forming substrate 10 of the section to be cut LN1 by the melted metallic film W3. The second fragile section W2 means an area in which the strength of a melt area solidified after the melt is fragile. It is preferable that the region of the opposite side to the bonding surface 10*a* in the section to be cut LN1 of the flow path forming substrate 10 is removed to form a concave portion R1, because the second fragile section W2 is easily formed in the entire section to be cut LN1 of the flow path forming substrate 10. When the concave portion R1 is formed in the section to be cut LN1 and the vibrating plate 16 is left therein, it is possible to form the flow path forming substrate 10 in a suitable thinness to form the second fragile section W2 in the entire section to be cut LN1. It is preferable that the concave portion R1 is set to be the communication section 13 to the reservoir 9, because the concave R1-only area is not required. In addition, if the insulator film 16*b* is removed from the section to be cut LN1 of the flow path forming substrate 10 and then the metallic film 48 is formed, it is possible to form the thin flow path forming substrate 10 in a further suitable thinness to form the second fragile section W2 in the entire section to be cut LN1.

In addition, the adhesive 55 of the section to be cut LN1 is modified by the melted metallic film W3, and then becomes the fragile section W4.

2. Example of Liquid Ejecting Head Manufacturing Method

Figure 4A:
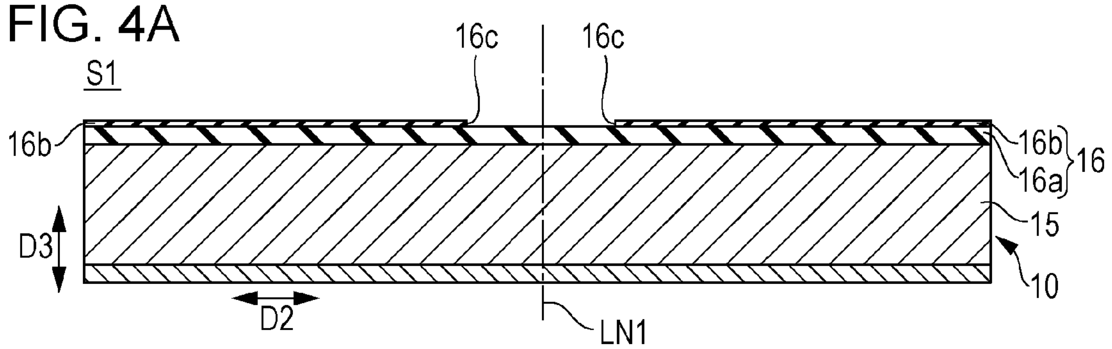
FIGS. 4A to 4D are cross-sectional views illustrating a manufacturing process of a recording head having another configuration.

Next, a recording head manufacturing method is illustrated with reference to FIGS. 4A to 9. FIGS. 4A to 9 illustrate a vertical cross-sectional view along the recording head 1A in which the detailed structure is different from that of FIGS. 2 to 3B in the longitudinal direction D2 of the pressure generation chamber. First, the elastic film 16*a* is integrally formed with respect to a surface of the silicon substrate 15 in a way that the silicon wafer of, for example, a surface orientation (110) for the flow path forming substrate 10 is thermally oxidized in a diffusion furnace at a temperature of approximately 1000 to 1200° C. The elastic film 16*a* is made of silicon oxide (a stoichiometric ratio $SiO_2$), and has a thickness of 400 to 1500 nm. Next, as illustrated in FIG. 4A, the insulator film 16*b* is formed on the elastic film 16*a*. For example, it is possible to form a zirconium oxide layer as the insulator film 16*b* in a way that a zirconium (Zr) layer is formed on the elastic layer 16*a* by a sputtering method, and then the zirconium layer is thermally oxidized in the diffusion furnace at a temperature of approximately 500 to 1200° C., for example. The insulator film 16*b* may have a thickness of approximately 300 to 500 nm, for example. In an example illustrated in FIG. 4A, the insulator film 16*b* is formed and then is patterned, and the through-hole 16*c* is in the section to be cut LN1. For example, by etching the insulator film 16*b*, the insulator film 16*b* of the section to be cut LN1 is removed from above the elastic film 16*a*. In addition, it is assumed that the concept of the vibrating plate 16 in which the metallic film 48 is formed on the surface thereof includes the elastic film 16*a*, from which the insulator film 16*b* is removed.

The above is a vibrating plate forming step S1.

Next, the lower electrode 20 is formed on the vibrating plate 16 by a sputtering method. In an example illustrated in FIG. 4B, the lower electrode 20 is formed and then is patterned. In addition, instead of the above-described zirconium oxide layer, or in addition to the zirconium oxide layer, a layer such as a titanium aluminum nitride (TiAlN) film, an Ir film, an iridium oxide (IrO) film and the like is formed on the vibrating plate 16 as the close contact layer or a diffusion preventing layer, and then the lower electrode 20 may be formed on the layer.

Next, the piezoelectric body layer 30 is formed on at least the lower electrode 20 by a liquid phase method such as a spin coating method, and the upper electrode 40 is formed on at least the piezoelectric body layer 30 by a sputtering method.

Figure 4B:
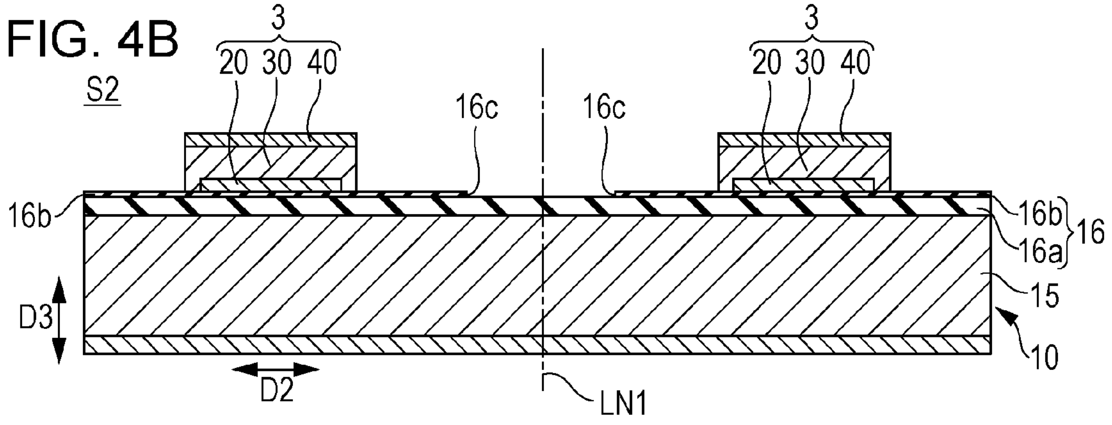

In an example illustrated in FIG. 4B, the upper electrode 40 is formed, and then the piezoelectric body layer 30 and the upper electrode 40 are patterned. Therefore, the piezoelectric element 3 having the piezoelectric body layer 30 and the electrodes (20, 40) is formed, and the piezoelectric actuator 2 having the piezoelectric element 3 and the vibrating plate 16 is formed. The above is a piezoelectric element forming step S2.

When forming the piezoelectric body layer 30, the piezoelectric body layer 30 having peroviskite oxide is formed through, a coating step of a precursor solution in which organic material of metal configuring the above-described PZT is dispersed in a dispersion medium, a drying step at approximately 170 to 180° C., a degreasing step at approximately 300 to 400° C., and a firing step at 550 to 800° C., for example. The combination of the coating step, the dying step, the degreasing step and the firing step may be performed several times. Furthermore, in addition to the liquid phase method, the piezoelectric body layer 30 may be formed by the liquid phase method such as the sputtering method.

Figure 4C:
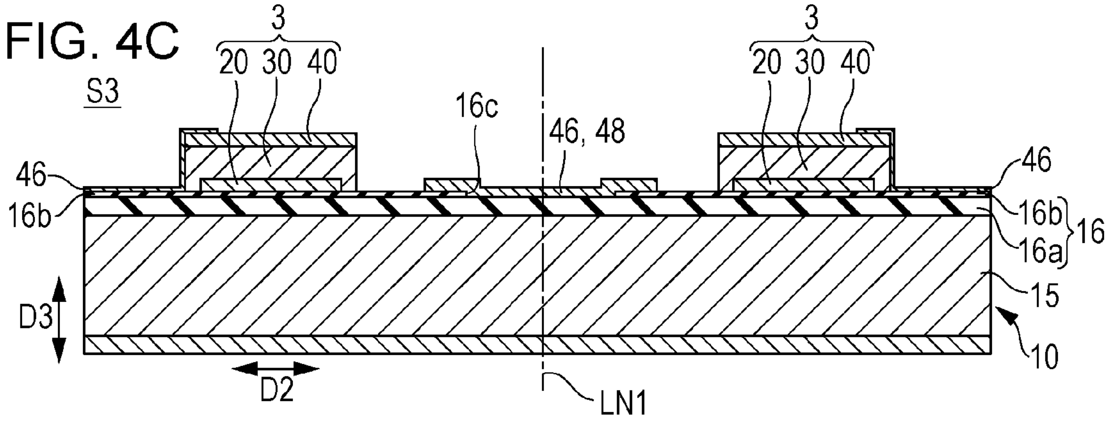

Next, as illustrated in FIG. 4C, the close contact layer 46 is formed on the substrate (a metallic film forming step S3). For example, the close contact layer 46 such as nickel-chromium may be formed over an entire surface of the substrate provided with the piezoelectric element 3 by the sputtering method, and may be patterned through a mask pattern made of a resist and the like. Then, it is possible to form the discontinuous metallic film 48 (for example, nickel-chromium layer) to the close contact layer of the lead electrode 45 on the elastic film 16*a* (for example, silicon oxide layer) of the section to be cut LN1. By the metallic film forming step S3, it is possible to form the close contact layer of the lead electrode 45 and simultaneously the metallic layer 48 that is an isolating layer, and to simplify a manufacturing process and therefore to reduce the cost. Of course, independently of a formation of the close contact layer of the lead electrode 45, the metallic layer 48 may be formed.

Figure 4D:
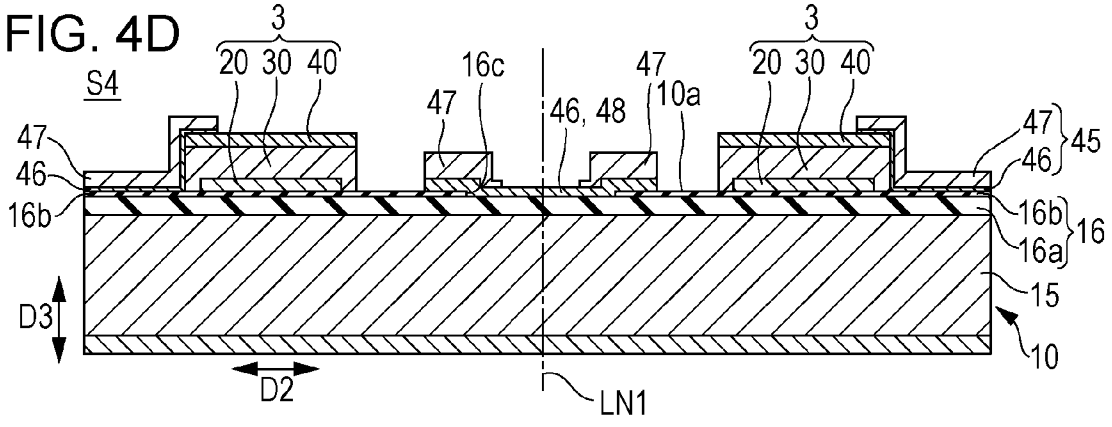

Next, as illustrated in FIG. 4D, the main metallic layer 47 is formed on the substrate (a main metallic layer forming step S4). For example, the main metallic layer 47 such as gold may be formed over the entire surface of the substrate by the sputtering method, and may be patterned via a mask pattern made of a resist and the like.

In addition, the electrodes (20, 40), the close contact layer 46 and the main metallic layer 47 can be formed by the sputtering method such as a DC (a direct current) magnetron sputtering method. The thickness of each layer can be adjusted by changing an applied voltage and a sputtering processing time of a sputtering apparatus.

Figure 5A:
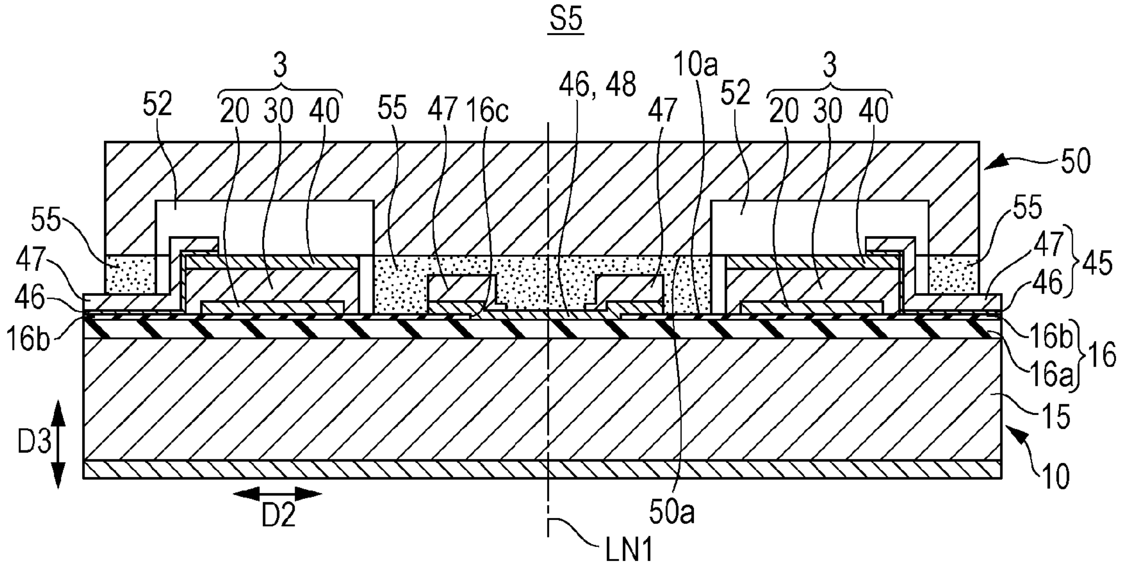
FIGS. 5A and 5B are cross-sectional views illustrating a manufacturing process of a recording head.

Next, as illustrated in FIG. 5A, the protection substrate 50 forming the piezoelectric element holding section 52 in advance is bonded to, for example, the bonding surface 10*a* of the flow path forming substrate 10 with the adhesive 55 (a protection substrate bonding step S5). In an example illustrated in FIG. 5A, in the section to be cut LN1, there is the adhesive 55 between the metallic film 48 provided on the bonding surface 10*a* and the bonding surface 50*a* of the protection substrate 50.

Figure 5B:
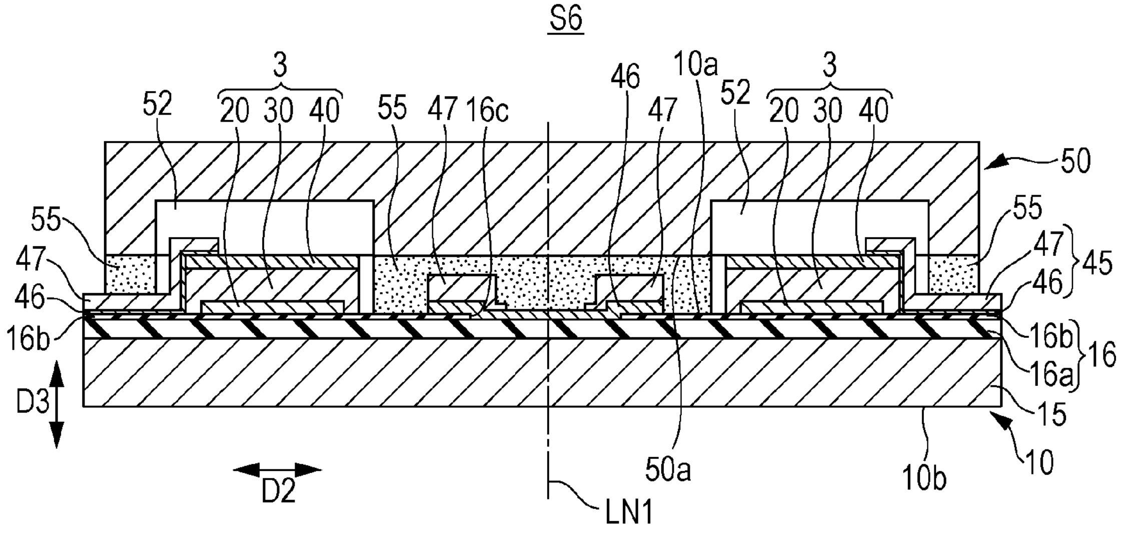

As illustrated in FIG. 5B, the silicon substrate 15 forming the elastic film 16*a* is allowed to set to approximately 60 to 80 μm, for example. For example, in the silicon substrate 15, the opposite side to the piezoelectric element 3 is polished until having some extent thickness and then, becomes to have a predetermined thickness by wet etching using fluoric-nitric acid (a cutting step S6). In addition, the surface of the opposite side to the vibrating plate 16 of the flow path forming substrate 10 becomes a nozzle side 10*b*.

Figure 6A:
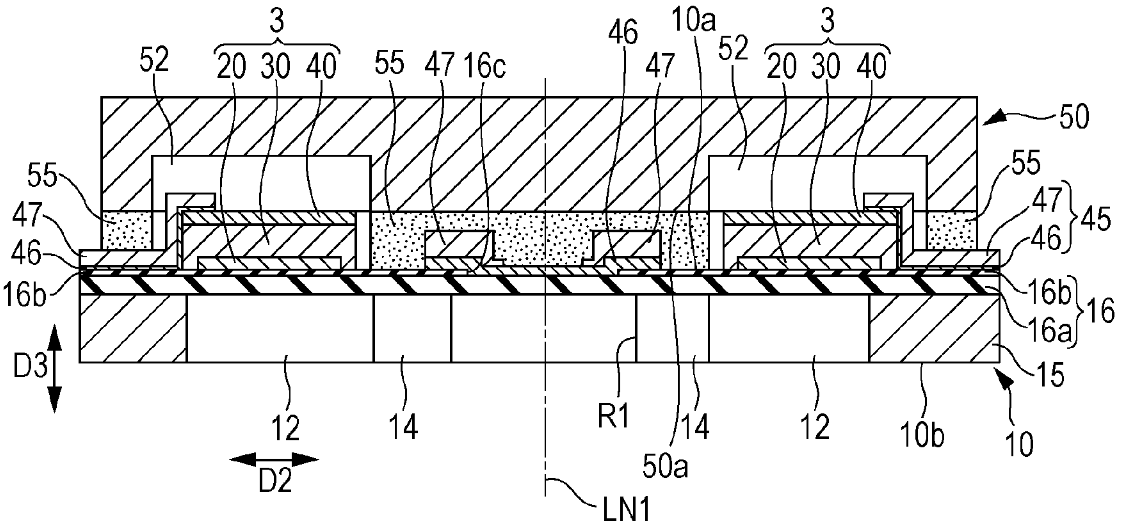
FIGS. 6A and 6B are cross-sectional views illustrating a manufacturing process of a recording head.

Next, as illustrated in FIG. 6A, the nozzle side 10*b* of the silicon substrate 15 is subjected to anisotropic etching (wet etching) with an alkaline solution containing a KOH aqueous solution via the mask, and forms the pressure generation chamber 12, the ink supply port 14, and the concave portion R1 (a flow path forming step S7). For example, when the mask film such as silicon nitride (a stoichiometric ratio $Si_3N_4$) is formed on the nozzle side 10*b* of the silicon substrate 15, a mask opening corresponding to the pressure generation chamber 12 and the concave portion R1 is formed by patterning, and etching is performed through a mask film having the mask opening, the liquid flow path (12, 14) and the concave portion R1 are formed. Then, the mask film may be removed by etching. The concave portion R1 is a removed region of the opposite side to the vibrating plate 16 in the section to be cut LN1 of the flow path forming substrate 10, and is a region to become the communication section 13 to the reservoir 9.

In addition, the liquid flow path may be formed before forming the piezoelectric element 3.

Figure 6B:
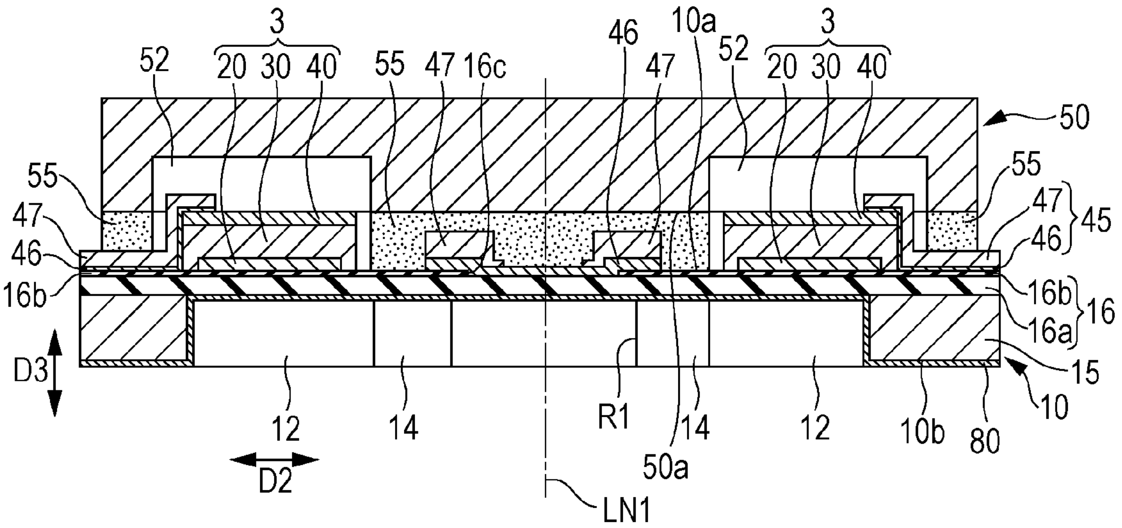

Next, as illustrated in FIG. 6B, the protection film 80 is formed in the inner surface of the liquid flow path (12, 14) and the concave portion R1 (a protection film forming step S8). For example, when the above-described tantalum oxide is deposited on the flow path forming substrate 10 from the nozzle side 10*b* by a chemical vapor deposition method, the protection film 80 can be formed over the entire surface of the nozzle side 10*b*, including the inner surface of the liquid flow paths (12, 14) and the concave portion R1.

Figure 7A:
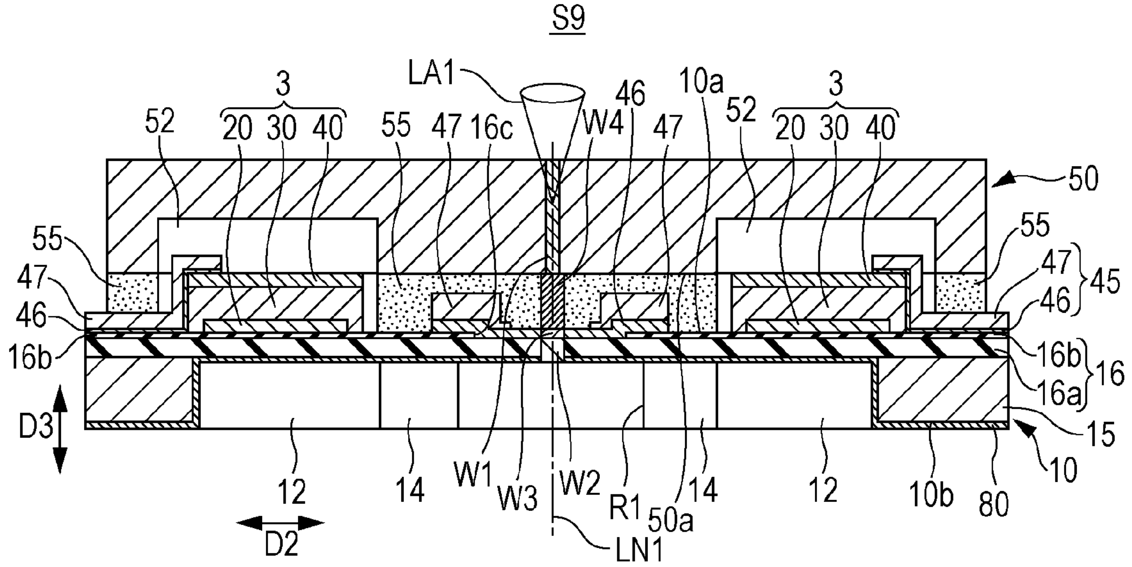
FIGS. 7A and 7B are cross-sectional views illustrating a manufacturing process of a recording head.

Next, as illustrated in FIG. 7A, the first fragile section W1 is formed in the protection substrate 50 in a way that the section to be cut LN1 of the protection substrate 50 is irradiated from the protection substrate 50 side with the laser beam LA1 whose condensing point P1 is focused thereon, and simultaneously the second fragile section W2 is formed in the flow path forming substrate 10 by the melt of the metallic film 48 of the section of to be cut LN1 (a fragile section forming step S9). As illustrated in FIG. 9, the first fragile section W1 is formed by scanning the laser beam LA1 a plurality of times along the thickness direction D3 while changing the depth of the condensing point P1 at the section to be cut LN1. As described above, the first fragile section W1 is a modification area in which the strength is fragile, and thus the protection substrate 50 is connected at the first fragile section W1, but is not divided. By the melted metallic film W3, the adhesive 55 of the section to be cut LN1 becomes the fragile section W4.

Figure 7B:
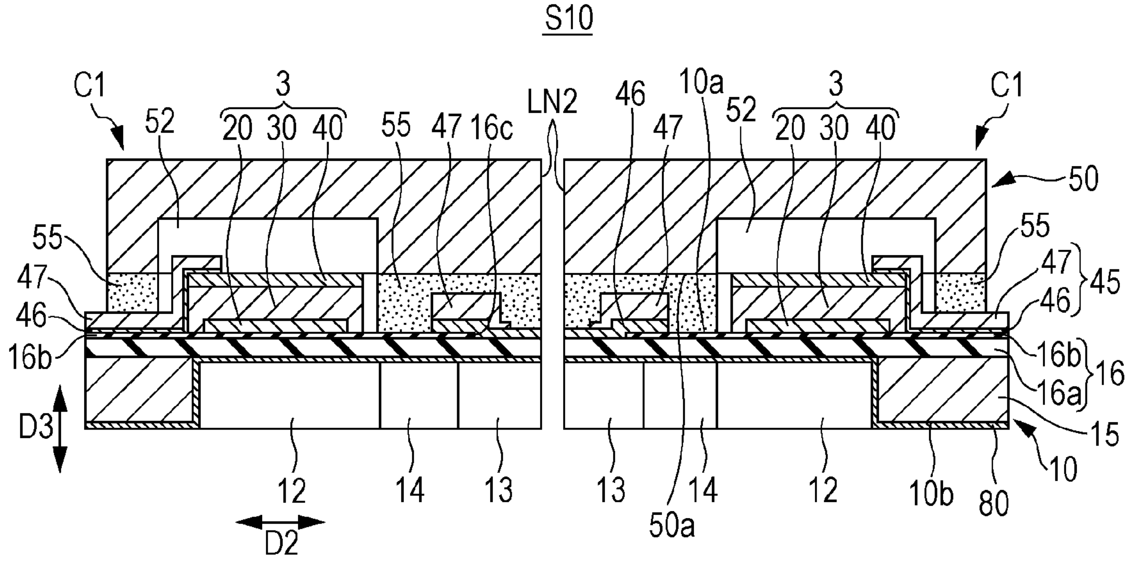

Next, as illustrated in FIG. 7B, the bonded substrates (50, 10) are divided along the fragile sections (W1, W2) by an expanding break (a division step S10). In a case of the expanding break, for example, an adhesive tape for a dicing is pasted to one surface of the substrate, and an external force extending the adhesive tape vertically and horizontally is applied to the substrate, thereby cutting the section to be cut LN1. Therefore, the substrates are separated to a plurality of chips C1 at the section to be cut LN1.

Figure 8A:
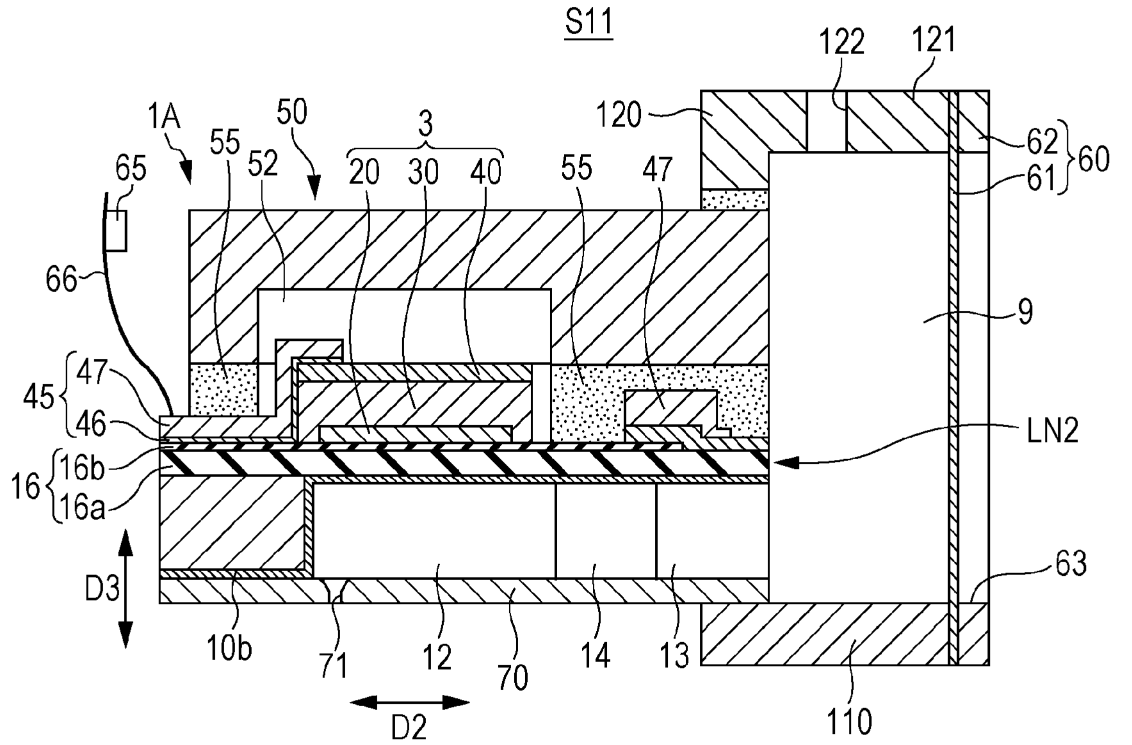
FIGS. 8A and 8B are cross-sectional views illustrating a manufacturing process of a recording head.
Figure 8B:
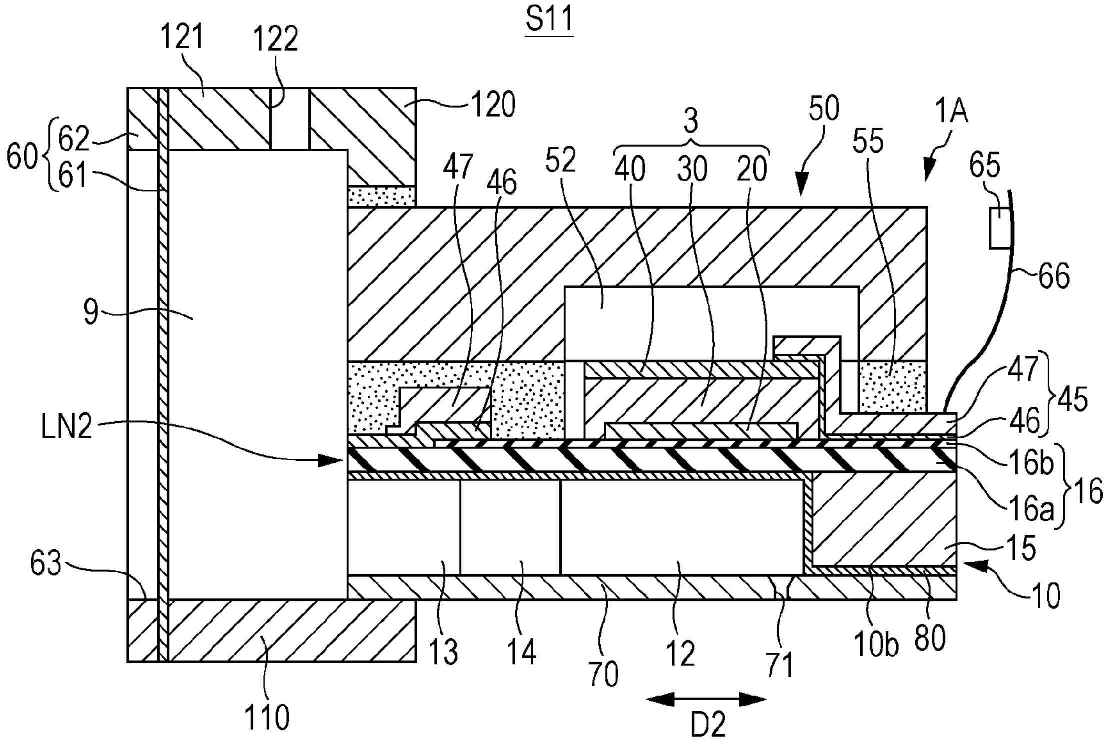

Next, as illustrated FIGS. 8A and 8B, the main metallic layer 47 (lead electrode 45) of each of the chips C1 and the drive IC 65 are connected to each other by the drive wiring 66, the nozzle plate 70 having the nozzle opening 71 is bonded to a surface of the pressure generation chamber 12 side of each of the chips C1, and the reservoir 9 is outwardly attached to the section to be cut LN2 (a reservoir forming step S11). In order to firmly fix the nozzle plate 70 of the opening side to the flow path forming substrate 10, an adhesive, a thermal welding film and the like can be used. The reservoir 9 is formed by bonding the reservoir bottom member 110, the reservoir ceiling member 120 having the liquid introducing hole 122, and the compliance substrate 60 on which the sealing film 61 and the fixing plate 62 are laminated, to the chips C1 in which the nozzle plate 70 is bonded. The divided concave portion R1 functions as the communication section 13 of the reservoir 9. In order to firmly fix the reservoir bottom member 110 to the surface of the opposite side to the pressure generation chamber 12 of the nozzle plate 70, the adhesive, the thermal welding film and the like can be used. In order to firmly fix the reservoir ceiling member 120 to the surface of the opposite side to the bonding surface 50*a* of the protection substrate 50, the adhesive, the thermal welding film and the like can be used. In order to firmly fix the compliance substrate 60 to these members (110, 120), the adhesive, the thermal welding film and the like can be used.

Therefore, the recording head 1A is manufactured.

The recording head 1A receives ink from the liquid introducing hole 122 connected to external ink supply means (not illustrated), and the inner surface thereof is filled with the ink until the ink reaches the nozzle opening 71 from the reservoir 9. When the voltage is applied between the lower electrode 20 and the upper electrode 40 for each pressure generation chamber 12 according to a recording signal from the drive IC 65, ink droplets are discharged from the nozzle opening 71 by deforming the piezoelectric layer 30, the lower electrode 20 and the vibrating plate 16.

As one example, the following sample was prepared.

The elastic film 16*a* made of the silicon oxide (a stoichiometric ratio $SiO_2$) was formed on a surface of the silicon single crystal substrate for the flow path forming substrate of the surface orientation (110) according to the above-described manufacturing method. The insulator film 16*b* made of the zirconium oxide (a stoichiometric ratio $ZrO_2$), which has the through-hole 16*c*, the piezoelectric element 3 having the piezoelectric body layer 30 made of the PTZ, the close contact layer 46 (containing the metallic film 48) made of nickel-chromium, and the main metallic layer 47 made of gold were formed on the elastic film. The nickel-chromium layer was set to be a thickness in which the flow path forming substrate 10 of the section to be cut LN1 is modified to the fragile section (W2) using the melt occurring with irradiating the laser beam LA1. The silicon oxide layer was formed on the surface of the silicon single crystal substrate for the protection substrate of the surface orientation (110), the piezoelectric element holding section 52 was formed on the substrate, and thus the flow path forming substrate 10 and the protection substrate 50 were bonded to each other using the adhesive 55. The liquid flow path (12, 14) and the concave portion R1 were formed on the nozzle side 10*b* of the flow path forming substrate 10 after bonding, and the protection film 80 made of tantalum oxide (a stoichiometric ratio $Ta_2O_5$) was formed over the entire surface of the nozzle side 10*b*. The section to be cut LN1 of the protection substrate 50 is irradiated from the protection substrate 50 side with the laser beam LA1 having a silicon permeability, whose condensing point P1 is focused thereon and thus the first fragile section W1 was formed on silicon of the protection substrate 50.

In addition, as one comparative example, a sample of a structure illustrated in FIG. 11 was manufactured. In a case of the sample of the comparative example, in the section to be cut LN1, the protection substrate 50 is bonded on the zirconium oxide layer of the section to be cut LN1 using the adhesive 55 without the metallic film.

For each sample, a cross-section of the substrate was observed. It was confirmed that in a case of the sample of the comparative example in which the metallic film is not formed on the bonding surface, the fragile section is not formed on the silicon oxide layer and the zirconium oxide layer in the section to be cut LN1 of the flow path forming substrate 10. The adhesive 55 of the section to be cut LN1 did not become the fragile section. On the other hand, it was confirmed that in a case of the sample of the example forming the metallic film on the bonding surface, nickel-chromium of the section to be cut LN1 is melted, and the silicon oxide, the zirconium oxide, and the tantalum oxide in the section to be cut LN1 of the flow path forming substrate 10 are modified (the second fragile section W2 is formed). It was confirmed that the adhesive 55 of the section to be cut LN1 is modified (the fragile W4 is formed).

In addition, for each sample, it was an attempt that an adhesive tape for dicing is pasted to one surface of the substrate, and the adhesive tape is extended vertically and horizontally, thereby dividing the substrates. In the comparative example, the chips which are not divided at the section to be cut LN1 occurred. On the other hand, the sample of the example was easily divided into a plurality chips at the section to be cut LN1.

From the above, in the manufacturing method, even if the section to be cut of the flow path forming substrate is made of material transmitting the laser beam, the metallic film of the section to be cut is melted, therefore, it is possible to form the second fragile section on the flow path forming substrate. Therefore, in the subsequent dividing step, it is possible to easily divide the protection substrate and the flow path forming substrate along the first fragile section and the second fragile section. Therefore, the manufacturing method does not require another step of cutting or removing the vibrating plate of the section to be cut, and it is possible to simplify the manufacturing process of the liquid ejecting head. Such effects are obtained similarly even with respect to various methods that separate the bonding body of the first substrate illustrated in the protection substrate and the second substrate illustrated in the flow path forming substrate.

3. Liquid Ejecting Apparatus

FIG. 10 illustrates an appearance of the ink jet recording apparatus (a liquid ejecting apparatus) 200 having the above-described recording head 1 (including 1A). When the recording head 1 is incorporated into the recording head units 211 and 212, it is possible to manufacture the recording apparatus 200 having improved durability. In the recording apparatus 200 illustrated in FIG. 10, the recording head 1 is provided for each of the recording head units 211 and 212, and ink cartridges 221 and 222 that are external ink supply means are provided to be attachable and detachable. A carriage 203 on which the recording head units 211 and 212 are mounted is provided to be movable reciprocally along the carriage shaft 205 attached to an apparatus body 204. When a drive force of a drive motor 206 is transported to the carriage 203 via a plurality of gears (not illustrated) and a timing belt 207, the carriage 203 moves along the carriage shaft 205. A recording sheet 290 fed by a paper feed roller and the like (not illustrated) is transported on a platen 208, and printing is performed by the ink which is discharged from the recording head 1 supplied from the ink cartridges 221 and 222.

4. Application and Others

In the invention, various modification examples may be considered.

A sequence of the above-described manufacturing process can be appropriately modified. For example, in the vibrating plate forming step S1, it is possible that the vibrating plate 16 is formed, the metallic plate 48 is formed, and then the piezoelectric element 3 is formed.

In the above described embodiment, an individual piezoelectric element is provided for each pressure generation chamber, but it is possible to dispose a common piezoelectric body in a plurality of pressure generation chambers, and provide the individual electrode for each piezoelectric pressure chamber.

In the above embodiment, although an upper side of the piezoelectric element is covered with the piezoelectric element holding section, it is possible to open the upper side of the piezoelectric element to an atmosphere.

The liquid discharged from the liquid ejecting head may be material capable of being discharging the liquid ejecting head, and includes fluid such as a solution in which a dye is dissolved, and a sol in which solid particles such as a pigment and metallic particles are dispersed in a dispersion medium. Such a liquid includes ink, a liquid crystal and the like. The liquid ejecting head can be mounted on a color filter manufacturing apparatus such as a liquid crystal display, an electrode manufacturing apparatus such as an organic EL display, a biochip manufacturing apparatus in addition to the image recording apparatus such as a printer.

In addition, even in a manufacturing method which does not have constituent elements according to dependent claims, but has only constituent elements according to independent claims, the above-described basic actions and effects are obtained.

As described above, according to the invention, it is possible to provide a technology which allows the chip manufacturing process to simplify.

In addition, a configuration in which configurations disclosed in the above-described embodiments and modification examples are substituted or combined each other, and a configuration in which configurations disclosed in the related art, the above-described embodiments and modification examples are substituted or combined can be realized. The invention includes these configurations.

The entire disclosure of Japanese Patent Application No. 2012-098104, filed Apr. 23, 2012, is expressly incorporated by reference herein.

What is claimed is:

1. A chip manufacturing method of separating a first substrate and a second substrate that are bonded to each other into chips, the separating into chips performed at a section to be cut, the method comprising:

forming a metallic film directly on a bonding surface between the first substrate and the second substrate in at least the section to be cut;

forming a first fragile section on the first substrate by irradiating the section to be cut of the first substrate, the irradiating of the section to be cut performed from the first substrate side with a laser beam whose condensing point is focused thereon, and forming a second fragile section on the second substrate by melting the metallic film that is disposed on the section to be cut, the melted metallic film disposed the section to be cut on the second substrate to thereby cause the formation of the second fragile section; and dividing the first substrate and the second substrate along the first fragile section and the second fragile section.

2. A liquid ejecting head manufacturing method which includes separating a flow path forming substrate and a protection substrate, the flow path forming substrate having a pressure generation chamber communicating with a nozzle opening and an piezoelectric element applying pressure to the pressure generation chamber, the protection substrate being located above the piezoelectric element, the protection substrate being bonded to the flow path forming substrate at a section to be cut, the method comprising:

forming a metallic film directly on a bonding surface between the flow path forming substrate and the protection substrate in at least the section to be cut;

forming a first fragile section on the protection substrate by irradiating the section to be cut of the protection substrate, the irradiating of the section to be cut performed from the protection substrate side with a laser beam whose condensing point is focused thereon, and forming a second fragile section on the flow path forming substrate by melting the metallic film that is disposed on the section to be cut, the melted metallic film disposed on the section to be cut of the flow path forming substrate to thereby cause the formation of the second fragile section; and dividing the protection substrate and the flow path forming substrate along the first fragile section and the second fragile section.

3. The liquid ejecting head manufacturing method according to claim 2, wherein a vibrating plate configuring a portion of a wall surface of the pressure generation chamber is formed on the bonding surface of the flow path forming substrate, the metallic film is formed on the vibrating plate of the section to be cut of the flow path forming substrate, and a region of an opposite side to the vibrating plate in the section to be cut of the flow path forming substrate is removed, and then the forming of the fragile sections is performed.

4. The liquid ejecting head manufacturing method according to claim 3, a silicon oxide layer is formed on the bonding surface of the flow path forming substrate, and the metallic film is formed on the oxide silicon layer.

5. The liquid ejecting head manufacturing method according to claim 3, wherein the pressure generation chamber is formed on a surface of the opposite side to the vibrating plate of the flow path forming substrate and the region of the opposite side to the vibrating plate in the section to be cut of the flow path forming substrate is removed, and a protection film having liquid resistance is formed in inner surfaces of the pressure generation chamber and the removed region, and then the forming of the fragile sections is performed.

6. The liquid ejecting head manufacturing method according to claim 3, wherein as material of the metallic film, at least a portion of material of a lead electrode led out from the piezoelectric element on the vibrating plate is used.

7. The liquid ejecting head manufacturing method according to claim 6, wherein as material of the metallic film, at least the same material as material of a close contact layer of the lead electrode is used.

8. The liquid ejecting head manufacturing method according to claim 2, further comprising: outwardly attaching a reservoir that accommodates liquid to be supplied to the pressure generation chamber to chips formed in the dividing.

9. A process for the manufacture of a liquid ejecting head comprising: forming the liquid ejecting head by the liquid ejecting head manufacturing method according to claim 2.

10. A process for the manufacture of a liquid ejecting head comprising: forming the liquid ejecting head by the liquid ejecting head manufacturing method according to claim 3.

11. A process for the manufacture of a liquid ejecting head comprising: forming the liquid ejecting head by the liquid ejecting head manufacturing method according to claim 4.

12. A process for the manufacture of a liquid ejecting head comprising: forming the liquid ejecting head by the liquid ejecting head manufacturing method according to claim 5.

13. A process for the manufacture of a liquid ejecting head comprising: forming the liquid ejecting head by the liquid ejecting head manufacturing method according to claim 6.

14. A process for the manufacture of a liquid ejecting head comprising: forming the liquid ejecting head by the liquid ejecting head manufacturing method according to claim 7.

15. A process for the manufacture of a liquid ejecting head comprising: forming the liquid ejecting head by the liquid ejecting head manufacturing method according to claim 8.

* * * * *